March 31, 1959　　　E. MENGE　　　2,879,938

VALUE TRANSFER MECHANISM

Filed Dec. 1, 1952　　　　　　　　　　　　4 Sheets-Sheet 1

Inventor:
Eberhard Menge
By Frank W. Dalow
Attorney.

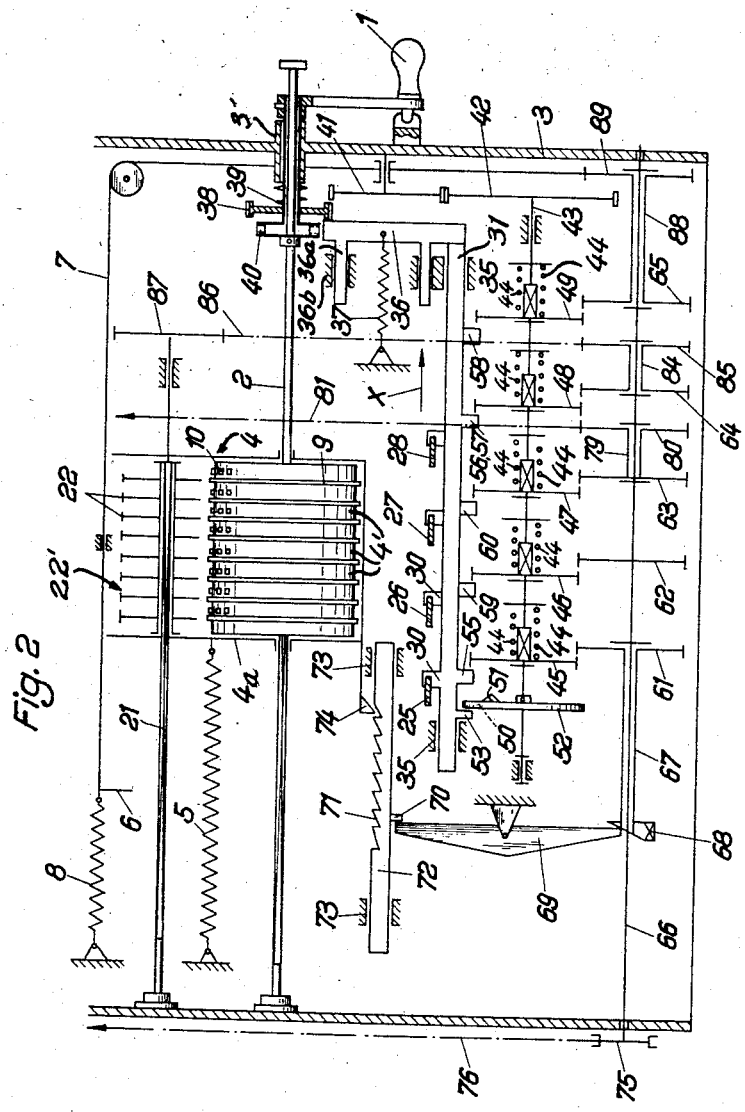

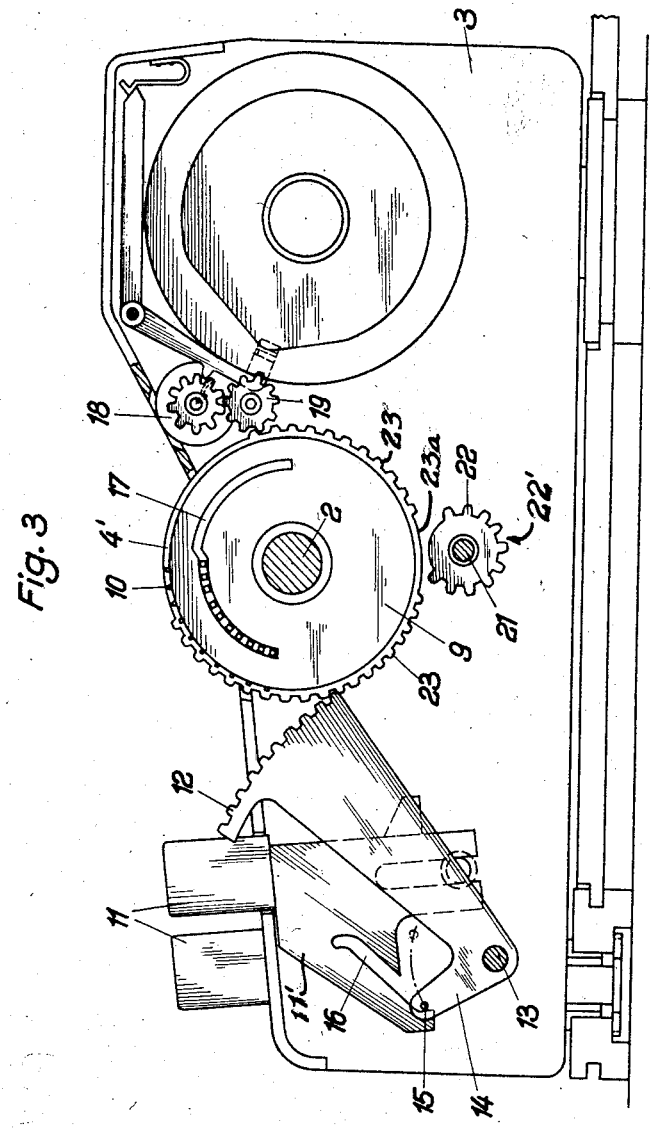

March 31, 1959
E. MENGE
2,879,938
VALUE TRANSFER MECHANISM
Filed Dec. 1, 1952
4 Sheets-Sheet 4
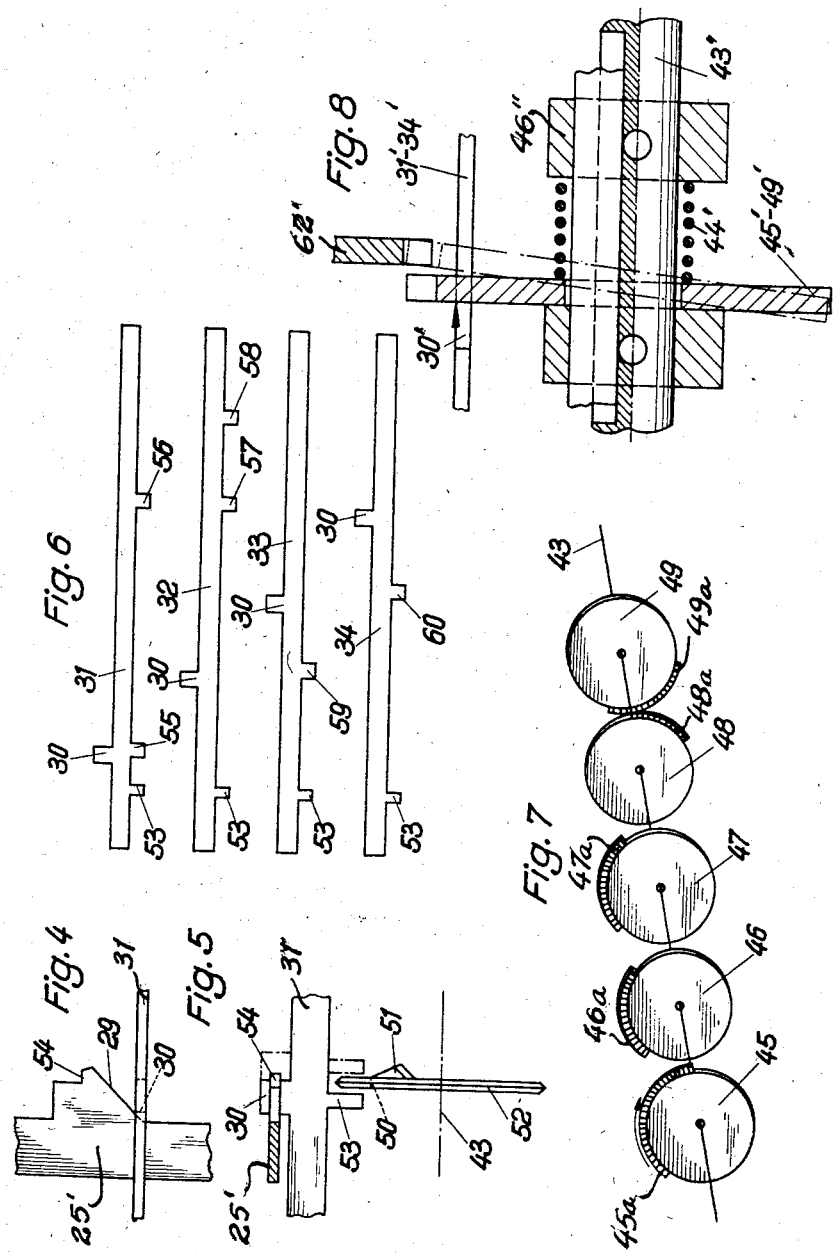
Inventor:
Eberhard Menge

United States Patent Office 2,879,938
Patented Mar. 31, 1959

2,879,938

VALUE TRANSFER MECHANISM

Eberhard Menge, Braunschweig, Germany, assignor to Brunsviga Maschinenwerke Aktiengesellschaft, Braunschweig, Germany Application December 1, 1952, Serial No. 323,411

7 Claims. (Cl. 235—63)

This invention relates to ten-key calculating machines with an ordinally shiftable differential actuator and stationary accumulator and revolutions counter.

It is an object of the invention to restransmit values from the accumulator or from the revolutions counter to the differential actuator.

It is still another object of the invention to retransmit these values to the differential actuator during the zeroizing operation of the accumulator or the revolutions counter, respectively.

It is a further object of the invention to provide a versatile coupling system for the described operations which coupling system is controlled by a minimum number of function-control keys.

Other objects and advantages of the present invention will become apparent from the following detailed description thereof in connection with the appended drawings. The drawings show two embodiments of the invention.

Fig. 2 is a plan view of part of the mechanism shown in Fig. 1 taken in another plane, also showing the carriage with the differential actuator, the zeroizing mechanism therefor, and a coupling system for controlling the operations performed by the machine according to the invention;

Fig. 3 is a cross section on an enlarged scale of the upper part of the machine shown in Fig. 1 along the line 3—3 of Fig. 1;

Fig. 4 is a side elevation on an enlarged scale of a detail of the machine shown in Fig. 2;

Fig. 5 is a plan view of the parts shown in Fig. 4, also showing a locking disk for the function-control slides;

Fig. 6 is an exploded view of the slides shown in Fig. 2;

Fig. 7 is a perspective view of the coupling mechanism shown in Fig. 2; and

Fig. 8 is a view, partly in elevation and partly in section, of a modified embodiment of certain parts shown in Fig. 2.

Figure 1:
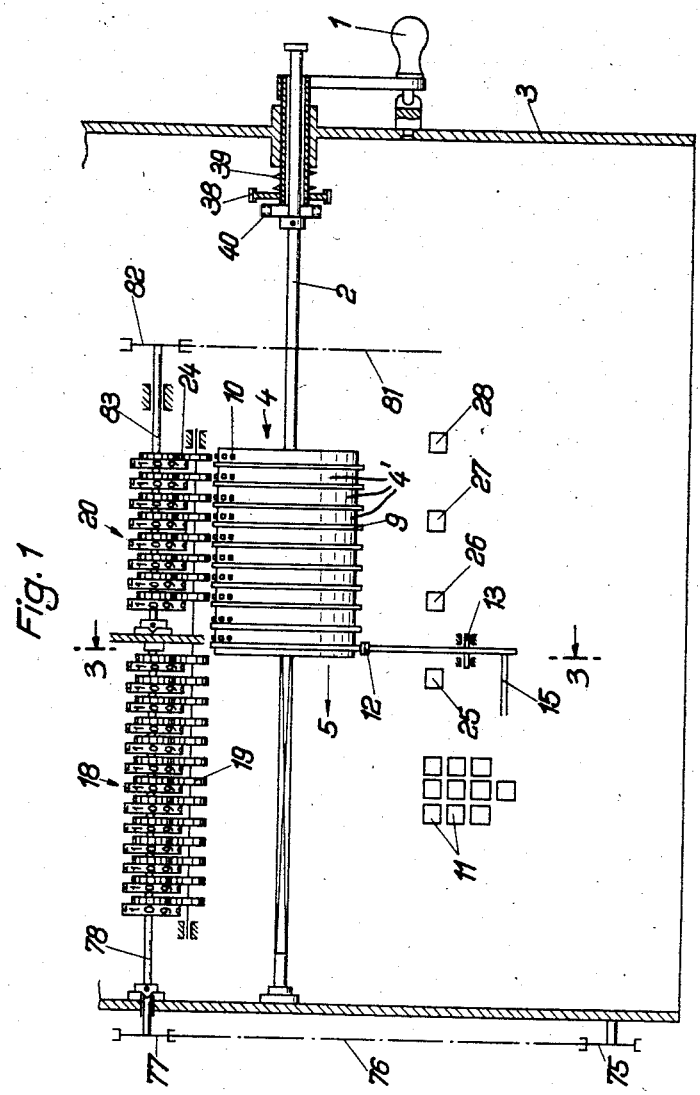
Fig. 1 is a top plan view, showing the arrangement of the numeral and function-control keys together with the accumulator and revolutions counter and associated parts.

Referring now to Figs. 1 and 2, a carriage 4a (Fig. 2) is shiftably mounted on a shaft 2. The shaft 2 is supported by the frame of a calculating machine and may be rotated by means of a crank 1, as will be described in more detail hereinafter. The carriage 4a carries a differential actuator generally denoted by 4, which differential actuator 4 comprises a plurality of pin wheels 4', each provided with a series of radially adjustable pins 10. An equal plurality of cam disks 9 are arranged in the differential actuator. Each pin wheel 4' constitutes a laterally adjacent and cooperating pair, with one of the cam disks 9, the cam disk 9, on rotation, causing a variable number of pins 10 of the adjacent pin wheel 4' to be radially displaced, the number of displaced pins 10 depending on the angle through which the cam disk 9 is rotated. A spring 5 urges the carriage 4a and the actuator 4 to the left; a wire 7 is provided with a stop 6 to move the carriage 4a to the right-hand initial position against the action of a spring 8.

Values are introduced into the actuator 4 by depression of the numeral keys 11; a toothed segment 12 (Fig. 3), which is common to all numeral keys 11, is pivoted on a shaft 13 and held in its raised position shown in Fig. 3 by a spring (not shown). An arm 14, projecting at right angles from the segment 12, is provided near its end with a projecting rod 15; rod 15 extends at right angles to the stems 11' of the numeral keys 11 and parallel to the shaft 13. Each key stem 11' has a slot 16 inclined relative to a horizontal plane by an angle corresponding to the value represented by the associated numeral key 11. If one of the numeral keys 11 is depressed, the projecting rod 15 is displaced by the left edge of the slot 16 so that the toothed segment 12 moves downward and turns the associated toothed cam disk 9 through an angle corresponding to the value represented by the depressed numeral key 11. On rotation of the toothed cam disk 9, a cam groove 17 of the cam disk 9 advances a corresponding number of the pins 10 of the adjacent pin wheel 4' radially outward in a manner known in the art. The toothed segment 12 first engages the cam disk 9 which is located directly to the right of the unit denomination of the accumulator 18 (Fig. 1).

After the value of one digit has been introduced, the carriage 4a of the calculating machine is shifted by one ordinal step to the left and the operation described above may be repeated for the next digit of the number.

When the complete number has been inserted into the differential actuator 4, the differential actuator 4 is rotated to transmit the number to the accumulator 18. In this transmission the radially projecting pins 10 of each pin wheel 4' rotate an associated pinion 19 which is connected to the accumulator 18.

Simultaneously the number of complete revolutions of the differential actuator shaft 2 is counted by a revolutions counter 20 in a known manner. If the differential actuator 4 is ordinally shifted to the right to a desired position opposite the revolutions counter, a set of pinions 24 connected to the revolutions counter will be engaged by the pins 10 which project radially. Rotation of the differential actuator 4, will then transmit a number set therein to the revolutions counter 20.

The differential actuator 4 can be moved a partial ordinal step to the right from any position either opposite the accumulator 18 or the revolutions counter 20. In this shifted position either the pinions 19 (Fig. 3) of the accumulator 18 or the pinions 24 of the revolutions counter 20 engage the teeth 23 of the toothed cam disks 9. Thus zeroizing of either the accumulator 18 or the revolutions counter 20 will result in a retransmission of the value set therein to the differential actuator 4. Rotation of a shaft 78 or a shaft 83, respectively, will zeroize the accumulator 18 or the revolutions counter 20.

The actuator zeroizing device 22' (Figs. 2 and 3) is supported with the actuator 4 by the shiftable carriage 4a. The zeroizing device 22' comprises a set of partly toothed wheels 22 mounted on a shaft 21. The shaft 21 is driven by a device to be described later. The number of wheels 22 is equal to the number of cam disks 9. When the shaft 21 is rotated, the partly toothed wheels 22 engage, respectively, the toothed portions 23 of any cam disk 9 which is angularly displaced from its initial position shown in Fig. 3. The toothed portions 23 of the cam disks 9 are separated by comparatively short smooth sections 23a on the cam disk circumference, which smooth sections 23a are opposite to the actuator zeroizing wheels 22 when the cam disks 9 are in their initial positions, as will be seen from Fig. 3.

Four function-control keys 25 to 28 (Fig. 2) are arranged on the key-board of the calculating machine.

The function-control key 25 is a retransmitting key which is effective to zeroize the differential actuator 4 and to cause the partial-step ordinal shift of the differential actuator 4 required for retransmission. The keys 26, 27, and 28 are zeroizing keys for the actuator 4, the accumulator 18 and the revolutions counter 20, respectively.

When one of the keys 25 to 28 is depressed, the inclined edge 29 of its stem 25' forces a projection 30 of an associated slide 31 to 34 to the right (see Figs. 2, 4, 5, and 6). The superposed parallel slides 31 to 34 are supported for a sliding motion in guides 35, which guides 35 are rigid with the frame 3.

A slide member 36 is retained in its initial position shown in Fig. 2 by a tension spring 37, in which position it abuts against all slides 31 to 34. This slide member 36 is shifted to the right when one of the slides 31 to 34 is shifted in the direction of the arrow in Fig. 2. Projections 36a, rigid with the slide member 36, are guided in stationary parts 36b. A gear wheel 38 is slidable on the shaft 2 against the action of a spring 39 positioned between the gear wheel 38 and a hub 3' rigid with the machine frame 3. This gear wheel 38 is connected for a common rotation to the hand crank 1. A lateral shift of the slide member 36 to the right in common with one of the slides 31 to 34 releases a clutch 40 on the shaft 2. Simultaneously the gear wheel 38 is brought into engagement with an intermediary gear wheel 41 which in turn meshes with a gear wheel 42 rigidly connected to a shaft 43.

The shaft 43 carries five driving wheels 45 to 49, which are slidably mounted on the shaft 43 for a common rotation. The five driving wheels 45 to 49 are held in an initial position, each by an adjacent spring 44; each driving wheel can be axially shifted along the shaft 43 against the action of its associated spring 44.

It will be seen that a lateral shift of one of the slides 31 to 34 results in disconnecting the hand crank 1 from the main shaft 2 of the machine and coupling it to the five driving wheels 45 to 49 on the shaft 43.

The shaft 43 further carries a locking disk 52 (Figs. 2 and 5) which is provided with a lateral cam 51 and has a peripheral notch 50. Each slide 31 to 34 (Figs. 5 and 6) has a locking pin 53 adapted to pass through the peripheral notch 50 of the locking disk 52 when the associated slide is laterally displaced as indicated in Fig. 5 by dash-dotted lines.

The stem 25' (Figs. 4 and 5) of each function-control key is locked in its depressed position by a shoulder 54 thereon which engages a projecting ear 30 of the associated slide in the shifted position of the slide.

The slides 31 and 32 (Fig. 6) are provided with pairs of projecting ears 55, 56 and 57, 58, respectively, disposed on the same side as the locking pins 53. The other two slides 33 and 34 are each provided with only one projecting ear 59 and 60, respectively.

The driving wheels 45 to 49 (Fig. 7) carry gear segments 45a to 49a in angularly staggered relationship. These driving wheels 45 to 49 may be laterally shifted on the shaft 43 to each mesh with an associated driven gear wheel 61 to 65 (Fig. 2). The driven gear wheels 61 to 65 are arranged on an auxiliary shaft 66. The gear segments 45a to 49a (Fig. 7) on the driving wheels 45 to 49 are angularly displaced to each become effective during a predetermined fraction of each complete revolution of the shaft 43. These five gear wheels become effective within four periods. During the first period the gear segment 48a on the driving wheel 48, which controls the zeroizing of the actuator 4, is effective. During the second subsequent period the gear segment 45a on the driving wheel 45, which controls the partial-step ordinal shift of the actuator 4 to the retransmitting position, is effective. During the third period, the gear segments 46a and 47a on the driving wheels 46 and 47, which control the zeroizing of the accumulator 18 and of the revolutions counter 20, respectively, are effective; the third period occurs within the second period. During the fourth and last period, the gear segment 49a on the driving wheel 49, which controls the shift of the actuator 4 to its initial right-hand position, is effective. The mechanical linkages of the driven wheels 45 to 49 to their respective control devices will now be described in detail.

The driven gear wheel 61 (Fig. 2) is mounted on a hollow shaft 67 which is coaxial with and surrounds the shaft 66. The hollow shaft 67 carries a cam disk 68 which cooperates with one arm of a two-armed rocking lever 69. The other arm of the rocking lever 69 engages a pin 70 on a rack 72 having saw-tooth shaped recesses 71; the rack 72 is slidably supported in guides 73 rigid with the frame 3 of the calculating machine. A pawl 74 engages the recesses 71. This pawl 74 is connected to the carriage 4a of the actuator 4 and cooperates in a known manner with the recesses 71 to produce an ordinal step-by-step shifting motion of the carriage 4a either when a numeral key 11 is depressed or when a special shifting key (not shown) is depressed.

The driven gear wheel 62 rotates with the auxiliary shaft 66. A sprocket wheel 75 on the end of the auxiliary shaft 66, which end projects beyond the frame 3 of the calculating machine, drives a sprocket wheel 77 (Fig. 1) to which it is connected by a chain 76. The sprocket wheel 77 is fastened to the shaft 78 of the accumulator 18, and, when rotated, zeroizes the accumulator 18.

The driven gear wheel 63 (Fig. 2) is loosely arranged on the auxiliary shaft 66 and connected to a hollow shaft 79 surrounding the auxiliary shaft 66. The hollow shaft 79 carries a sprocket wheel 80 which is drivingly connected to a sprocket wheel 82 (Fig. 1) by a chain 81. The sprocket wheel 82 is fastened to the shaft 83 of the revolutions counter 20, and, when rotated, zeroizes the revolutions counter 20.

The driven gear wheel 64 is also loosely arranged on the auxiliary shaft 66 and connected to a hollow shaft 84 surrounding the auxiliary shaft 66. The hollow shaft 84 carries a sprocket wheel 85 which is drivingly connected to a sprocket wheel 87 by a chain 86. The sprocket wheel 87 is fastened to the shaft 21 of the zeroizing wheels 22 of the actuator-zeroizing device 22'.

The driven gear wheel 65 is connected to a hollow shaft 88 surrounding the auxiliary shaft 66. The hollow shaft 88 carries a wheel 89 which, when rotated, pulls the wire of pullcord 7 against the force of the spring 8. On rotation of the wheel 89, the stop 6 will restore the actuator carriage 4a to its initial right-hand position.

The operation of the calculating machine is as follows:

(a) *Retransmission of a value from the accumulator 18 into the differential actuator 4*

The actuator 4 is moved into selected ordinal alignment with the accumulator 18 and the function-control keys 25 and 27 are depressed.

Depression of the key 25 shifts the corresponding slide 31 to the right and into its operative position. This displaces the slide member 36 against the force of the spring 37, and the gear wheel 38 is brought into engagement with the intermediary gear wheel 41 on release of the clutch 40.

As the slide 31 is shifted, its locking pin 53 traverses the peripheral notch 50 of the locking disk 52 (Fig. 5). In the shifted operative position of the slide 31, its projections 55 and 56 couple the driving gear wheels 45 and 48 (Fig. 2) to the driven gear wheels 61 and 64, respectively.

Depression of the key 27 substantially simultaneously shifts the corresponding slide 33 to the right and into its operative position as its locking pin 53 traverses the peripheral notch 50 of the locking disk 52 (Fig. 5). In the shifted operative position of the slide 33, its projection 59 couples the driving gear wheel 46 (Fig. 2) to the driven gear wheel 62 on the auxiliary shaft 66.

The stops 30 (Figs. 4 and 5) of the shifted slides 31 and 33 engage, respectively, the shoulders 54 of the depressed keys 25 and 27 and lock these keys in their depressed positions.

If the hand crank 1 (Fig. 2) is now turned, its rotation is transmitted through the gear wheels 38, 41 and 42 to the shaft 43 which carries the gear wheels 45 to 49 which all participate in the rotation. The locking disk 52 is also rotated and this removes the peripheral notch 50 from the paths of the locking pins 53 which are thus held in their displaced positions. This prevents the slides 31 and 33 from returning to their inoperative left-hand positions.

The driving gear wheels 48, 45 and 46 (Fig. 7) successively move the driven gear wheels 64, 61 and 62 due to the staggered arrangement of their gear segments 48a, 45a, 46a. First the gear segments 48a meshing with the gear wheel 64, rotates the shaft 21 of the actuator zeroizing device 22' over the chain drive 85, 86, and 87. Rotation of the actuator zeroizing device shaft 21 returns the cams disks 9 to their zero positions which cam disks in turn retract all projecting pins 10 to within the circumference of the actuator 4. The actuator 4 is thus zeroized. Now the gear segment 45a, meshing with the gear wheel 61, causes one complete revolution of the cam disk 68. At the beginning of this revolution, the cam swings the two-armed lever 69 on its pivot. The pin 70 of the rack 72 is thereby shifted to the right together with the pawl 74 engaging the rack 72 and secured to the actuator carriage 4a. This shift to the right involves a partial-step ordinal shift and moves the actuator 4 into the retransmitting position in which the pinions 19 of the accumulator 18 are in ordinal alignment with the teeth 23 on the toothed cam disks 9 of the actuator 4. The actuator 4 is retained in this retransmitting position by a plane face of the cam disk 68 during the subsequent rotation of the associated gear wheel 61. While the actuator 4 is retained in the retransmitting position, the driving gear segment 46a is effective to rotate the shaft 66 through the driven gear wheel 62, whereby the zeroizing shaft 78 of the accumulator 18 is rotated by means of the chain drive 75, 76, and 77. Rotation of the shaft 78 operates a resetting or zeroizing comb or the like (not shown) which is known in the art and which zeroizes the numeral wheels of the accumulator 18. The pinions 19 are individually rotated by their adjacent numeral wheels. Since in the retransmitting position each pinion 19 meshes with one of the toothed cam disks 9, these cam disks are rotated and the value previously contained in the accumulator 18 is retransmitted into the actuator 4 during the accumulator zeroizing operation.

Shortly before completion of one full rotation of the shaft 43, the slides 31 and 33, which have been shifted to the right, are successively moved still further to the right by the cam 51 (Fig. 5) on the locking disk 52 in cooperation with the locking pins 53. The stops 30 on the slides 31 and 33 are thus disengaged from the shoulders 54 of the corresponding keys 25 and 27 which are returned to their raised positions by springs (not shown). The slides 31 and 33 are now freed to shift to the left, and their locking pins 53 traverse the peripheral notch 50 of the locking disk 52 as the slide member 36 urges the slides 31 and 33 to the left due to the action of the spring 37. The spring 39 now recouples the gear wheel 38 to the shaft 2.

The driving gear wheels 45, 46, and 48 are each spring-loaded by a spring 44 which, on the withdrawal of the stops 55, 56 and 59, forces the respective driving gear wheel to its left-hand inoperative position, in which position the driving gear wheels are disengaged from their associated driven gear wheels 61, 62, and 64.

(b) *Retransmission of a value from the revolutions counter 20 into the differential actuator 4*

The actuator 4 is moved into selected ordinal alignment with the revolutions counter 20 and the function-control key 25 and 28 are depressed.

On rotation of the shaft 43 (Fig. 2) by the hand crank 1 the actuator 4 is zeroized through the parts 48, 64, 84, 85, 86, 87, 21, and 22. On further rotation of the shaft 43 the differential actuator 4 is shifted to its retransmitting position through the parts 45, 61, 67, 68, 69, 72 and 74 and retained in this position during the next step. The revolutions counter 20 is now zeroized through the parts 47, 63, 79, 80, 81, 82, and 83, and the value contained therein is thereby retransmitted into the actuator 4 by the meshing of the pinions 24 with the toothed cam disks 9 of the actuator 4. Finally the various elements are restored to their initial positions as described under (a).

(c) *Zeroizing of the actuator 4 and subsequent restoration to its initial right-hand position*

The zeroizing key 26 is depressed and the associated slide 32 couples the driving gear wheels 48 and 49, respectively, to the driven gear wheels 64 and 65. On turning of the hand crank 1 the actuator 4 is first zeroized, as previously described. Then the gear wheel 65 is driven and rotates the actuator restoring wheel 89 which pulls the carriage 4a to its initial right-hand position by the wire 7 which moves the stop 6 against the force of the spring 8.

If the function-control keys 26, 27, and 28 are simultaneously depressed, the differential actuator 4, the accumulator 18, and the revolutions counter 20 are all zeroized in one operation.

A modified embodiment of the invention is shown in Fig. 8. The driving gear wheels 45' to 49', corresponding to the gear segments 45 to 49 in Figs. 2 and 7, are tiltably mounted on the shaft 43', corresponding to the shaft 43 in Figs. 2 and 7. A spring 44', corresponding to the spring 44, inserted between each gear wheel and a stop member 46'', tends to return the driving gear wheel from its tilted to its upright position. The tilted position of the gear wheel is shown in dash-dotted lines, while its upright position is shown in full lines in Fig. 8. When a cooperating stop 30' of one of the slides 31' to 34', corresponding to the stop 30 of one of the slides 31 to 34, is shifted to the right, the associated gear wheel is forced into its tilted position in which it meshes with an associated driven gear wheel 62', corresponding to the gear wheels 61 to 65 in Fig. 2. The arrangement shown in Fig. 8 saves space in the calculating machine.

If desired, the calculating machine may be driven by a motor (not shown) instead of by hand.

While the invention has been described in detail with respect to preferred embodiments, it will be obvious to those skilled in the art that various modifications are possible without exceeding the scope of the invention as defined in the appended claims.

What is claimed is:

1. In a calculator having a frame, the combination comprising, a revolutions-counter axle supported by the frame, a revolutions counter mounted on said axle and having an ordinal plurality of rotatable numeral wheels with attached numeral-wheel pinions; an accumulator axle supported by the frame and extending coaxially with said revolutions-counter axle, an accumulator on said accumulator axle, said accumulator having an ordinal plurality of rotatable numeral wheels with attached numeral-wheel pinions; a carriage, an axle for said carriage secured to the frame and extending parallel to said revolutions-counter axle and said accumulator axle, said carriage being mounted on said axle for ordinal step-by-step displacement from an initial position, each step corresponding to the distance between adjacent pinions, an actuator supported by said carriage, said actuator having ordinal pin wheels and pin-wheel adjusting members arranged in laterally adjacent pairs, each of said pin-wheel adjusting members being designed as a toothed cam disk rotatable in one direction to adjust said adjacent pin wheel and rotatable in the opposite direction to zeroize said adjacent pin wheel; a set of numeral keys, means cooperating with said numeral keys for rotating said toothed cam disks through predetermined angles; said toothed cam disks being adapted to be rotated by any adjacent selected plurality of said pinions brought into ordinal alignment therewith by a partial-step ordinal shift of said carriage; an actuator-zeroizing device for rotating said toothed cam disks in the zeroizing direction; an accumulator zeroizing device; a revolutions-counter zeroizing device; a first carriage-shifting device for shifting said carriage to its initial position; a second carriage-shifting device for shifting said carriage by one partial-step ordinal shift into ordinal alignment for rotation of said toothed cam disks by a preselected plurality of said pinions at the initial period of its effectiveness and retaining said carriage in this position during the remaining period of its effectiveness; a drive for said five devices; five axially aligned driven gear wheels, each of said driven gear wheels actuating one of said five devices; a shaft extending parallel to the axis of said axially aligned driven gear wheels; a plurality of control members, each of said control members having an operative and an inoperative position, each of said control members when moved to its operative position operatively engaging said shaft to said drive for a predetermined time interval; five driving wheels rotatable with said shaft and each having an operative and an inoperative position, each of said driving wheels carrying a gear segment positioned to drivingly engage an associated one of said driven gear wheels for a specific fraction of said predetermined time interval when said driving wheel is in its operative position, each of said control members when moved to its operative position moving at least one of said driving wheels to its operative position; and means for individually moving said control members.

2. A machine as claimed in claim 1, in which each of said five driving wheels is moved from its inoperative to its operative position by an axial shift along said shaft, further comprising five springs, each spring urging one of said driving wheels to its inoperative position.

3. A machine as claimed in claim 1, in which each of said five driving wheels is moved from its inoperative to its operative position by a tilting motion relative to said shaft, further comprising five springs, each spring urging one of said driving wheels to its inoperative position.

4. A machine as claimed in claim 1, in which said plurality of control members comprises four slides mounted shiftably in a direction parallel to said shaft, and said means comprises four manually operable function-control keys, each adapted to cooperate with one of said slides to shift it from its inoperative to its operative position, at least two lateral projections on each side of said slides, said cooperating function-control key being adapted to shiftingly engage said first projection when operated, each of said remaining lateral projections being adapted to move one of said driving wheels from its inoperative to its operative position when said slide is so shifted.

5. A machine as claimed in claim 4, in which each of said slides further comprises a locking projection, a disc rotatable with said shaft and having a circumferential notch, said disc being axially positioned on said shaft to engage said locking projections to retain said slides in their operative positions during said predetermined time interval, said projections being dimensioned to traverse the notch on said disc during the shifting motion of said slides.

6. A machine as claimed in claim 1, further comprising an auxiliary shaft, one of said driven gear wheels being rotatable with said auxiliary shaft, four hollow shafts surrounding said auxiliary shaft, each of said four remaining driven gear wheels being rotatable with one of said hollow shafts.

7. A machine as claimed in claim 1, in which said second carriage-shifting device comprises a slidably mounted rack having a projection, a pawl secured to said carriage for a common shifting motion, said pawl being positioned to engage said rack, a pivotally mounted two-armed lever positioned to engage said projection with one of said arms, a cam-disc rotatable with said driving wheel for said second carriage-shifting device, said cam-disc being shaped to displace said other arm of said two-armed lever.

References Cited in the file of this patent

UNITED STATES PATENTS

| | | |
|---|---|---|
| 1,442,004 | Rudin | Jan. 9, 1923 |
| 1,927,771 | Carlstrom | Sept. 19, 1933 |

FOREIGN PATENTS

| | | |
|---|---|---|
| 337,607 | Great Britain | Nov. 6, 1930 |
| 60,756 | Sweden | Sept. 25, 1924 |